United States Patent [19]
Bäurle et al.

[11] 3,761,141
[45] Sept. 25, 1973

[54] DRIVE ARRANGEMENT WITH BRAKING SYSTEM

[75] Inventors: Horst Bäurle, Stuttgart; Karl Veil, Uhingen; Karlmann Hamma, Tettnang; Egon Mann, Friedrichshafen, all of Germany

[73] Assignees: Robert Bosch, GmbH, Stuttgart; Zahnradfabrik Friedrichshafen AG, Friedrichshafen, both of Germany

[22] Filed: Jan. 3, 1972

[21] Appl. No.: 214,997

[30] Foreign Application Priority Data
Jan. 8, 1971   Germany............... P 21 00 790.9

[52] U.S. Cl.............................. 303/21 F, 188/181 A
[51] Int. Cl.............................................. B60t 8/06
[58] Field of Search............... 188/181 A; 303/10, 303/21 CG, 21 F, 24 A

[56] References Cited
UNITED STATES PATENTS

| | | | |
|---|---|---|---|
| 3,325,226 | 6/1967 | Perrino | 303/21 F |
| 3,403,945 | 10/1968 | Dewar et al. | 303/21 F |
| 3,539,227 | 11/1970 | Drutchas et al. | 303/21 F |
| 3,667,816 | 6/1972 | Harned | 188/181 A |
| 2,136,574 | 11/1938 | Campbell | 188/181 A |
| 2,826,278 | 3/1958 | Highley | 188/181 A |
| 2,941,845 | 6/1960 | Osborne | 188/181 A |
| 3,582,152 | 6/1971 | Burkhardt et al. | 188/181 A |

*Primary Examiner*—Robert S. Ward, Jr.
*Attorney*—Michael S. Striker

[57] ABSTRACT

A drive has a variable-speed output element and a sensing device is associated with this element for sensing the speed thereof. A fluid-operated braking unit receives pressure fluid from a source via a conduit, and throttling device is interposed in the conduit and is controlled by the sensing device so as to progressively increase the supply of pressure fluid to the brake unit when the output speed sensed by the sensing device exceeds a certain limit.

7 Claims, 2 Drawing Figures

DRIVE ARRANGEMENT WITH BRAKING SYSTEM

BACKGROUND OF THE INVENTION

The present invention relates generally to a drive arrangement, and more particularly to an arrangement for controlling the output speed of a drive.

The invention is concerned, in particular with controlling the output speed of a hydrostatic drive, and still more specifically with controlling the drive speed of a vehicle which is provided with a hydrostatic drive. It is well known that if a drive of this type is accelerated excessively, either from the input side or from the output side, the number of rotations of the drive may rise to such an extent that the drive may become damaged. As an example it will be appreciated that if a vehicle is for instance provided with a hydrostatic drive, and if an acceleration is applied to the output of the hydrostatic drive via the vehicle itself, for instance by the mass of the vehicle becoming accelerated on a downgrade, then the hydromotor of the drive is operated as a pump. If the acceleration is sufficiently large or of sufficient duration, then the hydromotor may achieve excessively high rotational speed and may be damaged or entirely destroyed. Evidently, the same is true for example of a hydrostatic drive of a winch if the weight of a descending load causes the drive to be turned at an excessively high number of revolutions.

The problem itself is of course not new and for this reason such drives are generally provided with mechanical braking arrangements, one of which is for instance disclosed in German allowed application No. 1,189,867. However, the provision of such a mechanical braking arrangement requires that the operator utilizing the hydrostatic drive (in whatever form the latter may be) will constantly supervise the operational conditions. Evidently, therefore, the prevention of damage to the drive depends to a large extent upon whether the operator is careful or careless, whether he is skilled or unskilled, and similar conditions which, if they are negative, may lead to circumstances resulting in the damage or destruction of the drive.

SUMMARY OF THE INVENTION

It is, accordingly, a general object of the present invention to avoid the disadvantages of the prior art.

More particularly, it is an object of the present invention to provide a drive arrangement of the type under discussion which is reliably protected against damage of destruction even under critical conditions, that is under conditions where in the prior art arrangements such damage or destruction could or would occur.

A concomitant object of the invention is to provide such an arrangement which is relatively simple in its construction and which does not depend upon the supervision or operation of an operator.

In pursuance of these objects, and of others which will become apparent hereafter, one feature of the invention resides in a drive which, briefly stated, comprises drive means having a variable output speed and sensing means associated with the drive means for sensing the output speed thereof. Fluid-operated braking means is provided and a source of pressure fluid is connected with the braking means by an operative connection. Further, there is provided throttling means in the connection and operatively associated with the sensing means in order to control the flow of fluid to the braking means in dependence upon the output speed sensed by the sensing means.

With this construction according to the present invention, the braking means will be activated without any action on the part of an operator, because it will become automatically activated in response to the drive means exceeding a certain output speed which is sensed.

The source of pressure fluid may be a hydrostatic pump, if a liquid pressure medium is utilized, or it may be an air compressor if compressed air is utilized.

The supply of compressed fluid may be made directly to the adjusting cylinder of the braking arrangement, or it may be made to an auxiliary cylinder which is coupled with and operates a main braking cylinder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
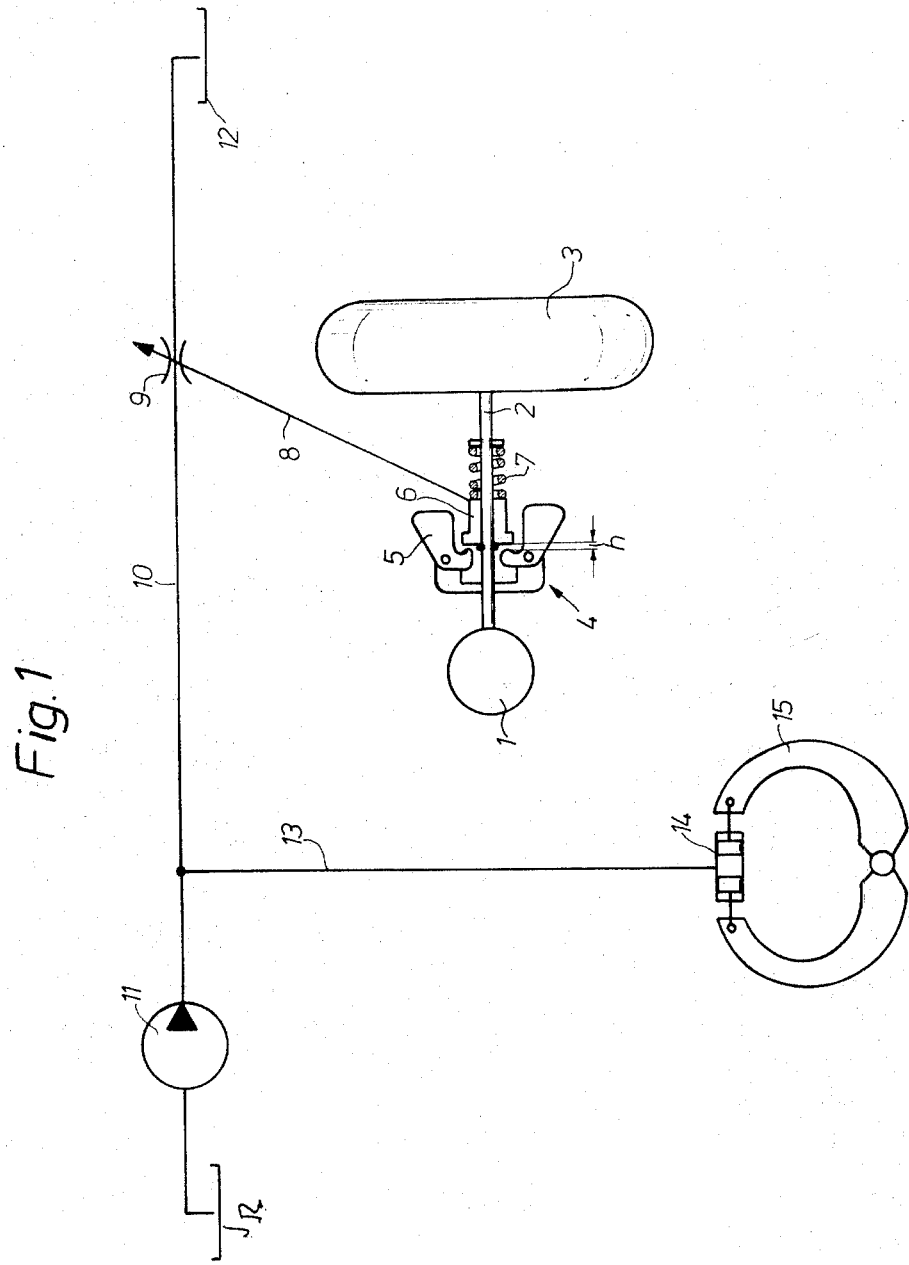
FIG. 1 is a diagrammatic illustration of a first embodiment of the invention.

Discussing firstly FIG. 1 in detail it will be seen that reference numeral 1 generally identifies a drive having an output shaft 2 which drives a wheel 3. Mounted on the output shaft 2 is a centrifugal force regulator 4 of known construction, having weights 5 which cooperate with the sliding sleeve 6 which is axially slidably mounted on the shaft 2. The sleeve 6 is biased towards the left in FIG. 1 by a spring 7 and between the weights 5 and the adjacent end of the sleeve 6 is a predetermined spacing $h$. The operation of the device 4 is already well known and it will suffice to point out that when the number of rotations of the output shaft 2 exceeds a preselected limit, the weights 5 will tend under the influence of centrifugal force to move outwardly and press against the adjacent end of the sleeve 6, tending to displace the same axially of the shaft 2 counter to the biasing action of the spring 7.

A conduit 10 communicates with a pressure fluid reservoir 11 and with a chamber 12, and interposed in this conduit 10 is an adjustable throttle 9 which can be adjusted or varied to throttle the flow of fluid through the conduit 10 to a greater or lesser degree. A control element 8 of the throttle 9 is connected with the sleeve 6.

A branch conduit 13 branches off the conduit 10 and communicates with the adjusting cylinder 14 ( for instance the wheel pressure cylinder) of a conventional operating brake 15 which serves to control the output speed of the arrangement and which may act either directly upon the drive 1 or upon the wheel 3, in either case being conventional in its construction and operation.

In the operation of the arrangement of FIG. 1, and assuming that the output speed of the shaft 3 reaches or exceeds a certain value, the weights 5 will move outwardly from the shaft 2 about their pivots under the influence of centrifugal force; in so doing they will come in contact with the inner ends against the adjacent end portion of the sleeve 6, displacing the latter towards the right counter to the biasing force of the spring 7. As the sleeve 6 moves, the control element 8 of the throttling device 9 is similarly shifted and adjusts the throttling device so that the latter decreases the flow-through cross-section of the conduit 10. As a result, a pressure differential develops, meaning that between the throttling device 9 and the reservoir 11 the pressure builds up which acts via the branch conduit 13 upon the cylinder 14. This in turn acts upon the brake 15 which either brakes the wheel or the aperture 2 of the drive 1, depending upon with which of these it is associated.

From a certain output speed on, namely from the time when the weights 5 first contact the sleeve 6, the braking force varies proportional to the output speed, so that the braking force is directly dependent upon and controlled by the output speed. This assures both an effective and simple protection against damage of the drive 1 as a result of excessive speeds.

Figure 2:
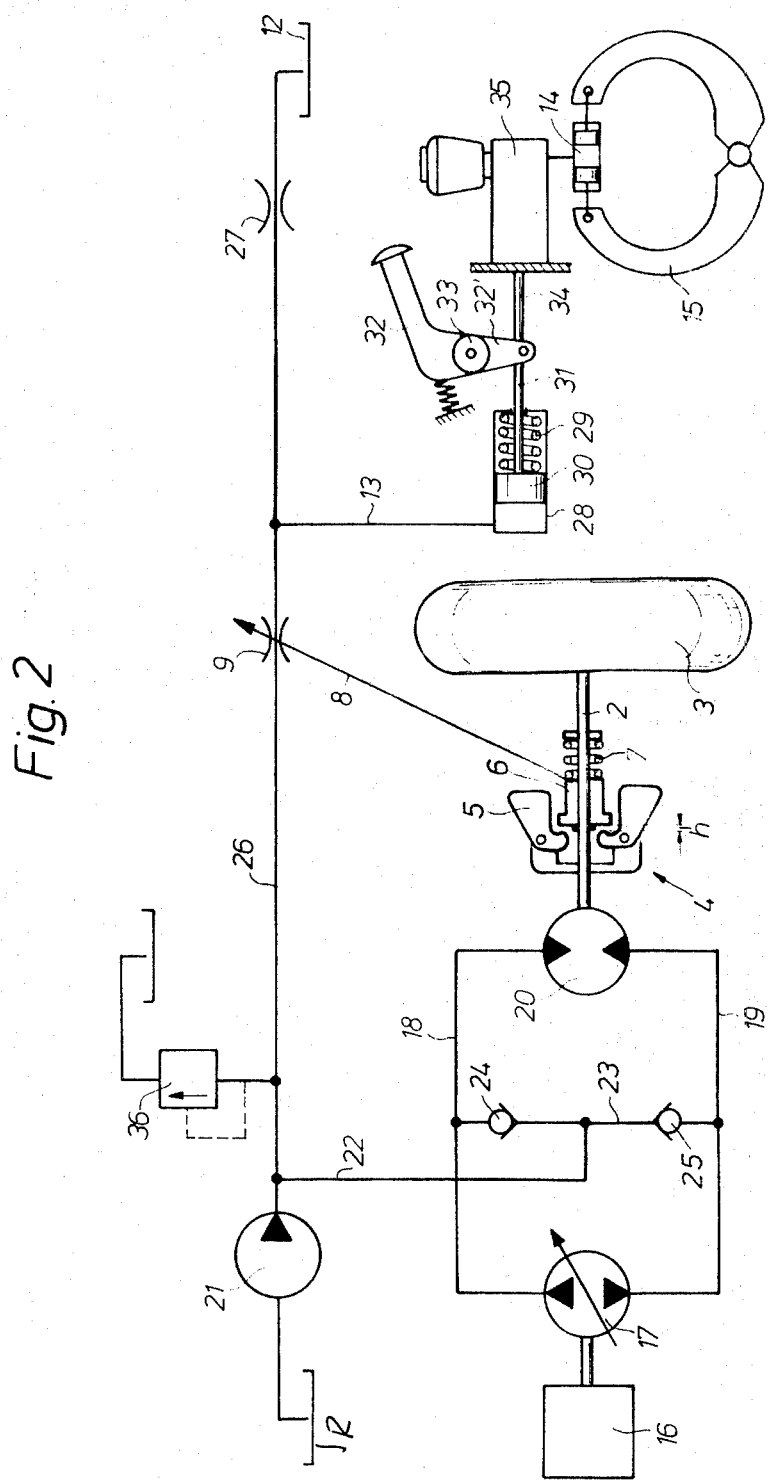
FIG. 2 is a diagrammatic illustration of a somewhat different second embodiment, incorporated in a vehicle with hydrostatic drive.

The embodiment of FIG. 2 is somewhat similar to that of FIG. 1, illustrating a hydrostatic drive arrangement in which the hydro motor is to be protected against excessive revolutions. In this embodiment, in which the principle according to the present invention is employed in a slightly different way, like elements as in FIG. 1 are identified with the same reference numerals.

Here there is illustrated a combustion engine 16 of a vehicle, with the engine 16 driving an adjustable hydrostatic pump 17. Two conduits 18 and 19 establish a communication between the pump 17 and a hydrostatic motor 20 which in turn drives via its output shaft 2 a vehicle wheel 3. An auxiliary pump 21 withdraws pressure fluid from the reservoir R and supplies it via conduits 23 and 22 —and one of two one-way valves 24, 25— into that one of the conduits 18 and 19 which is at the lower pressure.

In addition the auxiliary pump 21 supplies pressure fluid into a conduit 26 in which there is first mounted an adjustable throttling device 9 and downstream thereof a fixed but advantageously variable throttling device 27. The reference to "variable" with respect to the device 27 indicates that it is possible to set the device 27 for various different throttling actions but that once it is set to such a throttling action it cannot be varied until it is manually reset, as opposed to the device 9 which is constantly variable.

One end of the conduit 26 communicates with a chamber 12, and intermediate the throttling devices 9 and 27 the branch conduit 13 branches off the conduit 26 and communicates with the auxiliary cylinder 28. Mounted in the cylinder 28 is a slidable piston 30, shiftable counter to the biasing force of the spring 29 and provided with a piston rod 31 which is pivoted to the lower arm 32' of a brake pedal 32 which is in turn turnable about a pivot 33. Additionally, a leakage rod 34 is pivoted to the arm 32' and operatively associated with a main braking cylinder 35 which in a manner known per se acts upon the individual adjusting cylinders or wheel braking cylinders 14 of the operating brake 15.

The centrifugal force regulator 4 already discussed in FIG. 1, is mounted on the output shaft 2. A pressure limiting valve 26 is located upstream of the throttling device 9 to protect the conduit 26. In the embodiment of FIG. 2, contrary to that of FIG. 1, the throttling device 9 is normally closed and will open only when the device 4 acts upon the sleeve 6.

In the operation of the arrangement of FIG. 2 the pump 17 which is driven by the combustion engine 16, supplies pressure fluid via the conduit 18 to the hydrostatic motor 20 which in turn drives the vehicle wheel 3. The auxiliary pump 21 supplies pressure fluid via the conduit 22 and the one-way valve 25 into the conduit 19 which is at lower pressure than the conduit 18. In normal operation the throttling device 9 is closed. To brake the vehicle the brake pedal 32 is activated in conventional manner, and as a result of such activation the main brake cylinder 35 acts upon the individual wheel pressure cylinders 14 (one associated with each wheel) which in turn cause braking of the respective wheels.

If, now, the vehicle becomes accelerated —for instance during travel on a downgrade— then the hydrostatic motor 20 will act as a pump and the hydrostatic pump 17 has a motor which drives the combustion engine. This means that the kinetic energy of the vehicle is transmitted to the combustion engine via the hydrostatic drive, and that depending upon the size and length of the downgrade and of the acceleration obtained, the kinetic energy is partially or completely negated in the combustion engine 16 by the inherent drag or braking effect of the same. In the absence of special provisions and upon continued acceleration of the vehicle, the danger would exist in this arrangement that the hydrostatic motor would be accelerated excessively and become damaged or even destroyed.

This is avoided by the construction according to the embodiment in FIG. 2, because if the number of rotations of the output shaft 2 exceeds a certain predetermined maximum value, the weights 5 of the device 4 overcome the distance $h$ and thus displace the sleeve 6 in such a sense that the latter opens the adjustable throttling device 9. When this takes place, pressure fluid can pass through the conduit 26 and the pressure will develop between the throttling device 9 and 27 which can rise to the operating pressure required for the pressure limiting valve 36. The pressure between the devices 9 and 27 also acts via the branch conduit 13 upon the auxiliary cylinder 28 which displaces the piston 30 counter to the force of the spring 29 so that the piston rod 31 operates the rod 34 of the main braking cylinder 35, causing operation of the cylinder 14 and braking of the vehicle via the operating brake 15.

This sequence of events either reduces the output speed of the hydrostatic motor 20, or maintains it at a non-critical value, in either case preventing excessive rotation of the hydrostatic motor 20 in a sense which could damage or destroy it. There is a specific functional relationship between the brake pressure in the branch conduit 13 and the output speed via the characteristic of the device 4 in conjunction with the throttling device 27, and as a result the braking effect itself takes place in stages, automatically and without any need for actions on the part of the vehicle operator. This means that the arrangement according to the present invention is independent of and superimposed to any actuation of the brake which the operator himself may be carrying out, so that even if the operator is braking via the brake pedal 32 (but not sufficiently to prevent excessive speed of the hydrostatic drive) the arrangement according to the invention will provide the necessary additional braking effect independently of his action upon the brake pedal.

The device 4 could of course be replaced with other sensing devices capable of measuring the output speed or sensing it, for instance tachometer generators or electronic devices. The throttling device 27 can be of the entirely fixed type, that is it may not be adjustable at all if desired. The device 9 can be replaced by a valve which is controlled by the element 8 and functions in the manner discussed.

The arrangement according to the present invention is of course capable of utilization also for use with hydrostatic drives which operate on an open circuit as opposed to the closed circuit type discussed before. For instance, it can be utilized on drives employed on winches and the like, in which case the acceleration potentially capable of causing damage would be caused by the downwardly moving load supported by the winch, as opposed to the acceleration of a vehicle on a downgrade. Finally it should also be pointed out that the prime movers for driving the hydrostatic drive may need not only be combustion engines, but also electromotors or the like.

It will be understood that each of the elements described above, or two or more together, may also find a useful applications in other types of constructions differing from the types described above.

While the invention has been illustrated and described as embodied in a drive arrangement, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. In a drive, in combination, drive means having a variable output speed; sensing means including a centrifugal sensing device associated with said drive means for sensing the output speed thereof; fluid operated braking means including a cylinder and piston unit; a source of pressure fluid; an operative connection, including a conduit connecting said source and said unit; a non-pressurized chamber communicating with said conduit remote from said source; and throttling means operatively associated with said sensing means for controlling the flow of fluid to said braking means in dependence upon the output speed sensed by said sensing means, including one throttle interposed in said conduit intermediate said source and said chamber, and an additional throttle in said conduit downstream of said one throttle.

2. In a drive as defined in claim 1; and further comprising a main brake cylinder, and an auxiliary cylinder interposed in said conduit and associated with said main brake cylinder for actuating the same.

3. In a drive as defined in claim 1, said additional throttle being adjustable at the will of an operator.

4. In a drive as defined in claim 1, said one throttle being an adjustable throttle.

5. In a drive as defined in claim 1, said source including a fluid pump, and said brake means including an adjusting cylinder operatively associated with said pump; said drive means comprising a hydromotor having an output shaft which has said variable output speed, said sensing means being mounted on said output shaft.

6. In a drive, in combination, drive means having a variable output speed; sensing means associated with said drive means for sensing the output speed thereof; fluid-operated braking means comprising a cylinder and piston unit; a source of pressure fluid; an operative connection between said source and said braking means, comprising a conduit connecting said source and said unit, a main brake cylinder and an auxiliary cylinder interposed in said conduit and communicating with said main brake cylinder, a non-pressurized chamber communicating with said conduit remote from said source; throttling means interposed said conduit intermediate said source and said chamber and associated with said sensing means for controlling the flow of fluid to said braking means in dependence upon the output speed sensed by said sensing means; an additional throttling means in said conduit downstreams of the first-mentioned throttling means; and branch-conduit means connecting said auxiliary cylinder with said conduit means intermediate said throttling means and said auxiliary throttling means.

7. In a drive, in combination, drive means having a variable output speed; sensing means associated with said drive means for sensing the output speed thereof; fluid-operated braking means, including a main brake cylinder; a source of pressure fluid; an operative connection between said source and said braking means, comprising a conduit connecting said source and said braking means, an auxiliary cylinder interposed in said conduit for operating said main brake cylinder, and an adjusting cylinder also interposed in said conduit; an actuating rod connecting said adjusting cylinder with said main brake cylinder; a brake pedal connected with said actuating rod; and throttling means in said connection and operatively associated with said sensing means for controlling the flow of fluid to said braking means in dependence upon the output speed sensed by said sensing means.

* * * * *